Patented Nov. 3, 1953

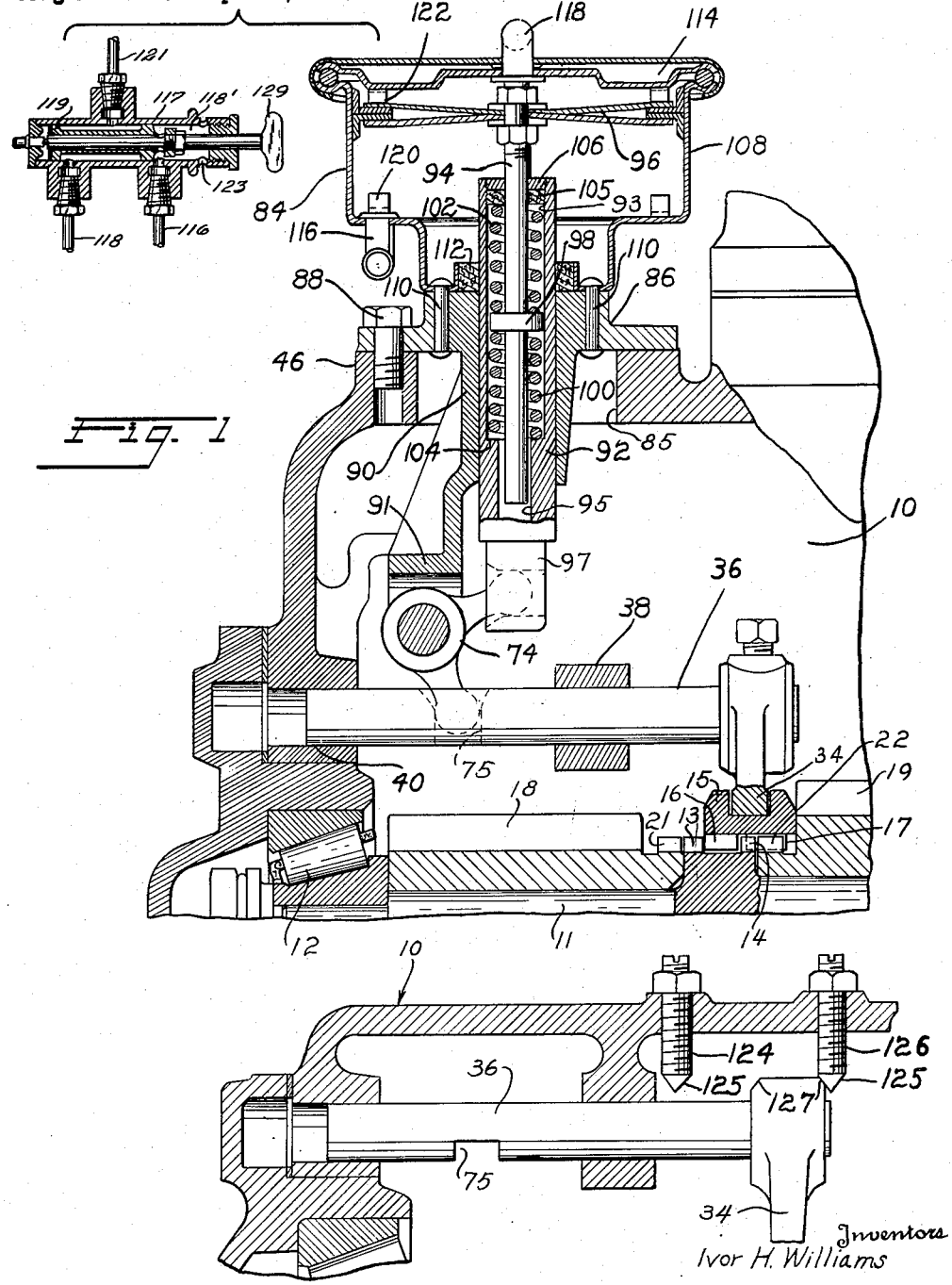

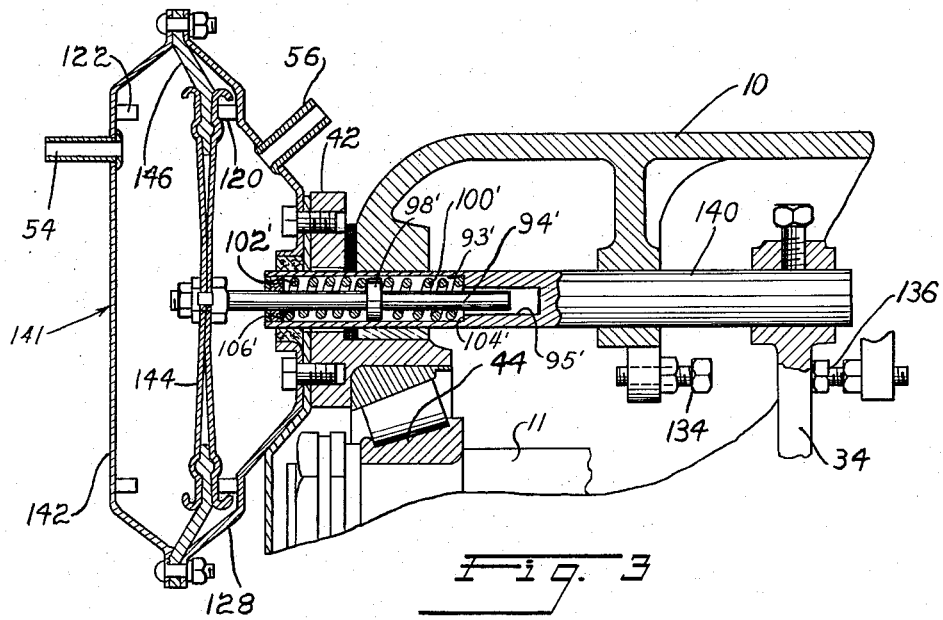
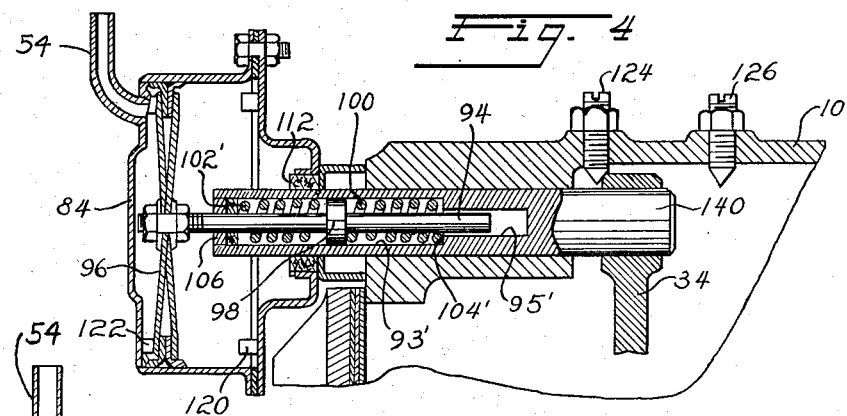
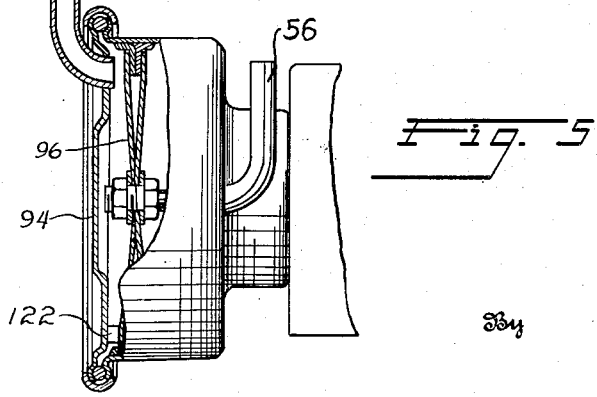

2,657,585

UNITED STATES PATENT OFFICE

2,657,585

ACTUATOR FOR SPEED CHANGING MECHANISM

Ivor H. Williams, Birmingham, and Ralph K. Super, Detroit, Mich., assignors to The Timken-Detroit Axle Company, Detroit, Mich., a corporation of Ohio Original application September 3, 1943, Serial No. 501,172. Divided and this application February 21, 1946, Serial No. 649,308

14 Claims. (Cl. 74—364)

This invention relates to actuators for speed changing mechanisms of the type disclosed in our pending application Serial No. 501,172, filed September 3, 1943, and of which the subject matter of the present application is a division.

The invention has more particular reference to a speed selecting actuator for multi-speed drive axles for motor vehicles in which means is provided for selectively driving the axle at high or low speed without declutching or disconnecting the train of drive mechanism from the source of power and the general object and purpose of the invention is to structurally simplify and increase the operating efficiency of actuators of this type.

In the operation of motor vehicles, particularly of the heavy duty type, it is desirable to provide axle drive gear ratios in addition to those afforded by the conventional variable speed transmission, which may be manually or automatically selectively controlled without declutching, and, while the selected transmission speed prevails, to increase or decrease the driving speed of the axle. Thus, instead of the usual three or four transmission speeds, six or eight axle driving speeds are available to obtain maximum speed with economical fuel consumption in the operation of the vehicle under varying traffic and road conditions.

By the provision of the additional gear ratios, increased tractive effort at low speed is obtained, with greater fuel economy at high speed by reducing the engine speed necessary to maintain a predetermined road speed when the power required to maintain the road speed is not excessive. Since the two gear ratios at the axle double the range of driving speeds available by the conventional variable speed transmission, such two-speed axles have in recent years been generally adopted for use in heavy duty vehicles. In such vehicles it has been found preferable to employ a positive engagement of the toothed members in the speed ratio selector apparatus. Preferably, I use a speed changing mechanism of more or less recent development having a special tooth construction in which a slidable toothed collar or like member and two toothed members on opposite sides thereof have coacting sets of teeth provided with flat smooth end faces lying entirely within parallel surfaces of revolution generated by lines rotated about the axis of rotation of the gears and wherein these smooth end faces intersect the torque transmitting surfaces of the teeth along sharp edges. The clearance or backlash between the coacting teeth is such that when engaged end to end, said teeth will not intermesh in the relative rotation of the members but will slidably abut at said end faces until a condition of substantial synchronism is established.

For the purpose of easily and smoothly shifting the collar which is usually rotated by the power drive out of mesh with one of the toothed members and into mesh with the other, by reason of the resistance due to high drive torque it is necessary to apply a force of relatively high magnitude to the collar to disengage the then engaged teeth, and then it is only necessary to apply to said collar a force of considerably less magnitude to engage the collar teeth with the teeth of the other member upon synchronization, so that an effective intermeshing relation of the teeth will be obtained without destructive clash or injury to the parts.

The present invention generically comprehends a novel power operated speed ratio selector actuating unit wherein an energy storing device for accomplishing a final stage of shift operation in a speed ratio selector apparatus is built into the connection between a power element and a member adapted to be reciprocated thereby.

It is also an important object of the invention to provide simple and effective novel means for positively controlling and limiting the successive application of high and low magnitude power operating forces to a shiftable toothed member in a drive speed changing mechanism.

A more particular object of the invention resides in the provision of a shiftable positive motion transfer member having an energy storing device novelly housed therein and operatively connected between a shiftable toothed member and a power actuated element, whereby said device is preloaded and a high magnitude power force is applied to said shiftable member to disengage it from one toothed speed ratio selector member during the power stroke of said element, and thereafter said energy storing device alone acts to apply a lower magnitude power force to said shiftable member to urge said shiftable member toward mesh with another coacting toothed speed ratio selector member.

An additional object of the invention, in one embodiment thereof, is to provide a novel mounting and arrangement of the energy storing device and the energizing means therefor within an axially shiftable rail to which a clutch shifting fork is directly connected.

A further detailed object of the invention resides in the provision of adjustable limit stops for limiting shifting movement of a toothed member in response to the action of such an energy storing device.

With the above and other subordinate objects in view the invention comprises the improved power actuator and the construction and relative arrangement of its several parts, as will hereinafter be more fully described, illustrated in the accompanying drawings, and subsequently incorporated in the subjoined claims.

In the drawings wherein we have illustrated several concrete practical embodiments of our present improvements, and in which similar reference characters designate corresponding parts throughout the several views:

Figure 1 is a horizontal sectional view of a portion of a two speed drive axle housing illustrating one embodiment of our improved clutch collar actuator unit mounted upon the front end wall thereof;

Figure 2 is a fragmentary horizontal sectional view illustrating one mounting and arrangement of the adjustable limit stops for the shifting fork;

Figure 3 is a sectional view similar to Figure 1, showing a somewhat modified form of the invention using a diaphragm power element mounted on the side wall of the axle housing;

Figure 4 is a similar sectional view illustrating a further modification like that of Figure 3 but using a piston power element; and Figure 5 is a detailed elevation partly in section of a portion of a modified power shifter device.

Referring for the present more particularly to Figure 1 of the drawings, 10 indicates a part of a rear axle housing structure. In the illustrated embodiment a shaft 11 driven through a pinion and ring gear set is journaled in housing 10 upon opposite end bearings 12 (only one illustrated) and is formed intermediate its ends with an enlarged portion having spaced sets of teeth 13 and 14. A shiftable clutch collar 15 is also provided with spaced sets of internal teeth 16 and 17. Gears 18 and 19 of different size and constantly meshed with corresponding gears in the differential mechanism are journaled on shaft 11 and provided with sets of teeth 21 and 22 respectively.

In the illustrated position of Figure 1, collar 15 bridges tooth sets 14 and 22 whereby shaft 11 and gear 19 are locked for rotation together. In the alternative position of collar 15 effected by the actuator to be described, the collar will bridge tooth sets 13 and 21 so as to lock shaft 11 and gear 18 for rotation together. Collar 15 is always in toothed engagement with one or the other of gears 18 or 19 for driving the axle in a selected one of its available speeds.

A shifting fork 34 for clutch collar 15 is securely fixed in conventional manner to one end of a reciprocable shift rod or rail 36 which is axially slidably supported at its other end in an opening 40 in one side wall of housing 10 and in a stationary bracket or lug 38 laterally spaced from said side wall. Rod 36 and collar 15 slide in parallel paths.

The actuator device, generally indicated at 84, includes a base 86 which is secured over an opening 85 in a housing boss 46 in the front end wall of housing 10. Base 86 is secured to boss 46 as by cap screws 88. Base 86 is integrally formed with a hollow cylindrical boss 90 projecting through opening 85 into housing 10. A tubular rod 92 is mounted for reciprocating movement in boss 90. Rod 92 is formed at its outer end with an internal bore or recess 93 which extends the greater part of its length and terminates in a shorter reduced diameter bore 95 closed by the reduced inner end of the rod at 97. Inner end 97 of rod 92 is operatively connected with one arm of a bell crank lever 74 pivotally mounted upon a rigid extension 91 of boss 90. The other arm of bell crank lever 74 is rockably engaged in a recess 75 provided in one side of the clutch fork shifting rod 36.

The outer end of bore 93 is closed by a sealing ring 105 and a disk 106 having threaded engagement in the end of rod 92. These closure members provide slide guide means for a coaxial piston rod 94 which is rigidly attached at its outer end to the center of a power driven piston element 96. Intermediate its ends, piston rod 94 is formed with a collar or annular enlargement 98 forming an abutment for the adjacent ends of coiled compression springs 100 and 102 respectively. The other end of the spring 100 has bearing contact against an internal annular shoulder 104 at the bottom of bore 93 while the other end of spring 102 is in bearing contact against the sealing member 105. Thus piston rod 94 is connected to reciprocatory rod 92 by a resilient lost motion connection housed within rod 92.

Piston 96 has reciprocatory movement within a cylinder 108 which is secured to base 86 by any suitable means, such as rivets 110, and carries a packing seal 112 surrounding rod 92. The outer end of the cylinder 108 is closed by a suitable cover 114. Suitable conduits 116 and 118 lead into the cylinder 108 from a suitable source of vacuum or other pressure at opposite sides of the piston 96. Stop members 120 and 122 respectively limit the travel of the piston 96 in each direction. These stop elements are of such length as to prevent possible distortion of the leather cup members at the periphery of the piston 96 and preserve the fluid sealing contact between the piston and the wall of the cylinder 108. These stops thus limit the axial movement of rod 92 and shift rod 36 in response to pressure differentials acting against piston 96, and additional means are provided for limiting further axial movement of rod 92 and shift rod 36 under the subsequent action of the energy storing springs 100 and 102 as will be explained.

Conduits 116 and 118 are connected to a suitable selector valve such as that of Figure 12 of Brownyer Patent 2,398,407. As illustrated in Figure 1, this valve may comprise a housing 117 having a bore 118' in which is slidable a cylindrical valve member 119 adapted to selectively connect a vacuum line 121 either to conduit 116 or conduit 118 to apply differential pressures to opposite sides of the power element 96. The outlet 123 supplies atmospheric pressure to the conduit not connected to the vacuum, and a knob 129 is provided for manual operation of the valve.

As shown in Figure 2, this additional means for limiting the axial movement of shift rod 36 comprises the two laterally spaced apart screws 124 and 126 respectively which are threaded in the wall of housing 10. These screws are provided with cone surfaced inner ends 125 adapted for engagement respectively by the chamfered or bevelled surfaces 127 on opposite sides of the hub of fork 34. Thus, by axially adjusting the screws 124 and 126 so as to vary the distance between cone surfaces 125, the overall limits of shifting movement of fork 34 may be variably adjusted.

Each of the screws carries a suitable lock nut to fix the same in its adjusted position.

In the operation of the invention as above described, when pneumatic pressure is admitted through conduit 118 to the cylinder 108 at the outer side of piston 96, or when vacuum is supplied through conduit 116 to the other side of the piston 96, piston rod 94 is moved inwardly relative to reciprocable rod 92, thereby compressing spring 100. After a limited relative movement between rods 94 and 92, spring 100 becomes solid and the entire fluid pressure force acting on piston 96 is then transmitted without loss of power through said spring to rod 92 and applied through bell crank 74 to shifter rod 36 to slide clutch collar 15 to the left in Figure 1. Thus disengagement of the clutch teeth of collar 15 and gear 19 is accomplished by the initial power stroke of actuating device 84. Such disengagement does not take place until foot pressure on the accelerator is momentarily relieved, thus releasing the torque load on the engaged teeth. After such disengagement action is complete and, before clutch teeth 13 and 31 come into contact, further power driven movement of piston 96 is prevented by the limit stops 120. The energy stored in compressed spring 100 is now available to continue the inward movement of rod 92, thus further shifting rod 36 and fork 34 in the same direction to contact teeth 13 of the clutch collar with teeth 21 of the other speed change gear 18. When teeth 13 and 21 contact they remain in sliding abutment by reason of the tooth formation above described and the pressure of spring 100 and when the speeds of rotation of said gear 18 and collar 15 are substantially synchronized, clutch 15 moves into smooth non-clashing intermeshing engagement with gear 18 under the pressure of spring 100.

When pneumatic pressure is admitted to cylinder 108 at the inner side of piston 96, or vacuum applied to the other side of piston 96, said piston is operated in the manner above described to shift rod 36 in the opposite direction to compress spring 102 and disengage clutch collar 15 and thereafter continue the movement of the clutch collar under the energy stored in spring 102 to establish an intermeshed relation between said collar and gear 19.

Thus there is a two phase or two stage shifting movement of collar 15, the first or tooth disengaging movement of the clutch collar being effected by the power operated stroke of piston 96, while the second or intermeshing movement of the clutch collar is effected by the lesser power of the energy storing device housed within reciprocable rod 92.

In the form of the invention shown in Figure 3, the clutch actuating unit, instead of being mounted on the front wall of housing 10, is located at one side thereof and includes a diaphragm unit 141 enclosed in a casing member. In this case, a diaphragm rod 94' and energy storing springs 100' and 102' are directly mounted in a bore 93' formed in reciprocable clutch fork shifter rod or rail 140 which carries shift fork 34 is supported for axial sliding movement on the housing substantially in the manner above described. Bore 93' terminates in a smaller bore 95' into which the end of rod 94' projects, thus providing an internal shoulder 104' for seating spring 100'. Spring 102' reacts between enlarged formation 98' on rod 94' and the closure assembly 106' provided at the outer end of bore 93'. Diaphragm rod 94' is thus slidably connected to reciprocable rod 140 and is also connected thereto by the resiliently lost motion means housed within rod 140.

The outer end of rod 94' is centrally secured to a power driven diaphragm element 144 which includes a flexible membrane 146 secured at its perimeter between marginal flanges formed on the pneumatic pressure or vacuum receiving chamber sections 128 and 142 respectively. Chamber sections 128 and 142 comprise parts of casing member 141 and each casing part is provided with an outwardly extending flange. The flanges of the casing parts are secured together. Casing part 128 is secured, as by bolting, to the axle housing. The section 128 is secured to a flanged cage 42 mounted in the side wall of the housing 10 and supporting the anti-friction bearing unit 44 for one end of shaft 11. In this case also, limit stops 120 and 122 respectively are provided on chamber sections 128 and 142 to limit movement of the diaphragm 144 so that the power force will be applied to that phase or stage of the shifting operation which involves only the disengagement of the clutch collar from the then engaged gear element, while the meshing of the teeth on the collar with the clutch teeth on the other gear is accomplished in the subsequent second phase or stage by the energy stored in one or the other of the springs 100 or 102 as heretofore described in connection with the construction shown in Figure 1. The pneumatic pressure medium or vacuum is supplied at opposite sides of the diaphragm 144 through the conduits 54 and 56 respectively. Conduits 54 and 56 are connected to the source of vacuum through a suitable manually operated selecting valve for controlling operation of the motor or diaphragm unit. This may be the selector valve illustrated at Figure 12 of Brownyer Patent 2,398,407 which is a continuation-in-part of Serial Number 387,977 filed April 10, 1941. The same type of adjustable limit stops for the shifter rod and fork are provided as in Figure 1. In Figure 3, adjustable stops 134 and 136 for limiting overall travel of fork 34 are mounted in spaced stationary parts of the housing structure at opposite sides of the fork arm. The diaphragm unit at 141 thus provides power means for shifting the clutch shifter fork. This unit is a double-acting double-ended vacuum operated motor because it is powered in either direction by selective application of vacuum through conduits 54 or 56.

Figures 4 and 5 illustrate further embodiments in which the mounting and arrangement of the energy storing springs directly within the hollow end of the fork shifter rail 140 is combined with the pneumatic piston and cylinder mechanism of Figure 1, instead of the fluid pressure operated diaphragm of Figure 3. In Figure 5, the piston and cylinder construction is substantially identical with that shown in Figure 1, while in Figure 4 the parts are in reversed position and the cylinder cover member is mounted in fixed relation to the axle housing 10 while the body wall of the cylinder is peripherally flanged and detachably secured to the cover member. As will be readily understood, the shifter of Figures 4 and 5 operates to provide a two stage shifting motion of the clutch fork, in the same manner as the construction shown in Figures 1 and 3.

From the foregoing, the construction and manner of operation of the several selected embodiments of the invention will be readily understood. It will be seen that by embodying an energy storing device in the two stage operating connections between the clutch shifter fork and the power actuated element, which energy storing means preferably comprises a spring means housed within a reciprocable rod and functioning in each direction of movement thereof, we have materially simplified and increased the operating efficiency of prior actuator devices of this type. Also the simple and compact arrangement herein disclosed results in a more accurately controlled two stage shifting movement of the clutch collar and a final smooth and noiseless intermeshed engagement of the teeth thereon with the clutch teeth on the driving gear. The simple and rugged structural form of several cooperating elements has resulted in economical production with high operating efficiency.

While our present improvements are of general application to all classes of motor vehicles, the invention is particularly advantageous in the operation of heavy duty vehicles such as large capacity trucks where reduction in running time, low operating costs and increased earnings per ton mile are factors of prime consideration. With the conventional single speed axle it is necessary to compromise between pulling ability on grades and top speed on level roads. Such a compromise is unnecessary in the use of a two speed double reduction axle which enables the operator to obtain both pulling ability and speed, or in other words, the best gear ratios for both extremes of operating conditions. Such a two speed axle with our improved clutch actuating unit enables the operator to pre-select at will the high or low axle gear ratios, the clutch shift being carried out with maximum speed and facility, under normal operating conditions and without declutching and consequent loss of headway. Thus, both maximum pulling ability and speed with prevalent heavy loads can be obtained under varying road conditions, resulting in lower fuel consumption and maximum economy of operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In actuating means for a shiftable gear ratio selecting member, a supporting member, a reciprocable fork shifting rail mounted on said supporting member, a reversibly operable power actuated member, means limiting travel of said power actuated member to a predetermined disstance in either direction, and connecting means between said power actuated member and rail to transmit controlled forces of different magnitudes in immediate sequence to said rail, including means carried by the rail rendered effective during movement of said power actuated member in either direction and operable after conclusion of said movement of said power actuated member to apply a final reduced force to continue movement of the rail in said direction, said last-named means comprising spring means housed within a tubular portion of the fork shifting rail.

2. In a speed changing mechanism wherein a first toothed member is shifted out of engagement with a second toothed member and into engagement with a third toothed member, a power driven element and means interconnecting said element and said first toothed member comprising a reciprocable member and a resilient lost motion connection housed within said reciprocable member, and stop means for limiting the length of stroke of said power driven element so that application of direct power drive from said element to said first toothed member is effective during disengagement of said first and second toothed members but is interrupted prior to engagement of said second and third toothed members, said resilient connection being compressed during the stroke of said power driven element and expanding to continue shift of said first toothed member in the same direction into engagement with said third toothed member when their speeds are synchronized.

3. In an automotive vehicle provided with a multi-speed axle including a casing member and reciprocable shift fork, means for operating said multi-speed axle to establish the same in either a high gear setting or a low gear setting, power means for moving said multi-speed axle operating means in one or the other of two directions to effect the aforementioned operation of the axle mechanism, said power means comprising a double-acting double-ended vacuum operated motor comprising two casing parts each part provided with an outwardly extending flange, said flanges being secured together, said motor further comprising a reciprocable power element, force transmitting means interconnecting said power element with the aforementioned reciprocable shift fork, said force transmitting means including a hollow rod secured to the shift fork, a rod secured to the power element and housed within said hollow rod and means including yieldable means interposed between and constituting the connection between said rods, said power means further including a selector valve for controlling the operation of said motor.

4. In actuating means for a shiftable gear ratio selecting member, a vacuum motor comprising a motor casing adapted to be secured to an axle housing, a power element movably mounted within said motor casing, a shifter rod having a hollow end portion, a second rod secured to said power element and projecting through said motor casing into the hollow portion of said shifter rod, and spring means housed by said hollow rod portion and surounding said second rod for yieldably interconnecting said rods, said spring means being compressed during initial movement of said power element in either direction and subsequently expanding to accomplish a gear shifting movement of said shifter rod.

5. In the actuating means defined in claim 4, said motor casing comprising two parts secured together along adjacent peripheries, and stop means on each casing part adapted to be engaged by said power element for limiting travel of said power element in both directions within said casing.

6. In a speed ratio selector mechanism, a toothed member movable into and out of engagement with either of two other relatively rotatable toothed members, said members which are engaged being normally maintained against relative axial movement and released for relative axial movement upon interruption of torque therebetween, energizable power means operably connected to said movable toothed member, a connection between said power means and said movable toothed member comprising two relatively slidable members yieldably connected by spring means housed by one of the slidable members, said power means when energized being operable upon release of said torque for disengaging said movable toothed member from that one of said other toothed members which is engaged therewith and moving said movable toothed member toward but short of engagement with the other of said two toothed members with relatively high power, said spring means being energized during said high power actuated movement of said movable toothed member, and means comprising said energized spring means immediately effective upon said movable toothed member after completion of its high power travel for moving said movable toothed member into engagement with the other of said two toothed members with materially reduced power.

7. In a speed change mechanism for moving a first toothed member out of engagement with a second relatively rotatable toothed member and into engagement with a third relatively rotatable toothed member, a fluid motor comprising a casing containing an element movable in response to fluid pressure differentials on opposite sides, a power driven member rigid with said element and projecting from the casing, a speed change control member mounted for reciprocation, means providing a relatively slidable connection between said power driven and control members, compressible spring means enclosed within said connection between said members, means for limiting the stroke of said power driven member in either direction, said first and second toothed members being disengaged and said spring means being compressed during the stroke of said power driven member in one direction, and means for limiting said stroke to stop high powered actuation of said first toothed member before it engages said third toothed member while permitting said compressed spring means to expand to engage said first and third toothed members when they are synchronized.

8. In actuating means for a shiftable gear ratio selecting mechanism, a fluid motor having a movably mounted power driven element, a shifter member having a hollow end portion, a second member secured to said power driven element and projecting into the hollow portion of said shifter member, and spring means housed by said hollow portion and surrounding said second member for yieldably interconnecting said members, said spring means being compressed and said shifter member being moved a predetermined distance to accomplish a gear shift operation during movement of said power driven element in either direction, and said compressed spring means subsequently expanding to accomplish a further gear shifting movement of said shifter member.

9. In a change speed mechanism, a housing containing variable speed gearing and a gear shifter fork and having an opening, a reciprocable rail within the housing secured at one end to said fork and having a hollow bore at its other end, a motor casing secured over said opening in the housing, a power driven reciprocable shaft projecting from said motor casing into said bore, said shaft being slidably guided within said rail, and cooperating spring and stop means within said bore interconnecting said shaft and rail in both directions of movement of said shaft.

10. In the change speed mechanism defined in claim 9, stops projecting into said housing for engagement with said shifter fork for limiting its movement in either direction.

11. In combination with a housing containing variable speed mechanism and having an opening, a speed ratio selector within said housing, actuating means for said selector comprising a fluid motor secured to said housing and having a casing, a base on said casing having a boss projecting into said housing through said opening, a bore in said boss, a power element reciprocable within said casing, a first member slidably supported in said bore and projecting into the casing, and a member rigid with the power element and slidably connected to said first member, and spring means enclosed in the connection between said members adapted to be compressed upon relative sliding movement of said members in either direction.

12. In the actuating means defined in claim 11, a projection on said boss, a bell crank pivoted on said boss with one end in pivotal connection with said first member and an operable connection between the other end of said bell crank and said speed ratio selector.

13. In actuating means for a speed ratio selector mechanism, a fluid motor casing having an opening in one end wall, a gear shifter member extending slidably through said opening into said casing and having an outer end externally of said casing and a bore in its inner end opening into the casing, a power element within the casing shiftable upon application of fluid pressure differentials to opposite sides thereof, a rod rigid with said element extending within the bore, spring means surrounding said rod within the bore, and cooperating parts on said spring means and rod and within said bore operable for yieldably connecting the rod and gear shifter member when said power element is shifted in either direction.

14. In an automotive vehicle provided with an internal combustion engine having an accelerator for in part controlling the operation of said engine and a two speed rear axle gear mechanism including rotatable members to be meshed and demeshed, a reciprocable shifter rod, power means for moving said rod comprising a motor and a stem operated thereby to move said rod in one or the other of two directions to establish or disengage the axle mechanism in either one or the other of its two settings, said rod having a spring mechanism enclosed therein, said motor when energized serving to operate said spring mechanism to move said rod to move the two speed gear mechanism toward one of its two gear ratio settings and to compress said spring mechanism, said spring mechanism when expanding serving to further move the axle mechanism in the same direction to establish or disengage the mechanism in one of its two settings as said members of said gear mechanism are synchronized.

IVOR H. WILLIAMS.
RALPH K. SUPER.

References Cited in the file of this patent

UNITED STATES PATENTS

| Number | Name | Date |
| --- | --- | --- |
| 1,720,989 | Ahlm | July 16, 1929 |
| 1,740,818 | Killingsworth | Dec. 24, 1929 |
| 1,965,751 | Rush | July 10, 1934 |
| 2,356,598 | Lang et al. | Aug. 22, 1944 |
| 2,373,259 | Price | Apr. 10, 1945 |